United States Patent
Otsuka et al.

(10) Patent No.: US 7,622,050 B2
(45) Date of Patent: Nov. 24, 2009

(54) PROCESS FOR POLISHING GLASS SUBSTRATE

(75) Inventors: Koji Otsuka, Yokohama (JP); Masabumi Ito, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/615,530

(22) Filed: Dec. 22, 2006

(65) Prior Publication Data
US 2007/0125747 A1 Jun. 7, 2007

Related U.S. Application Data

(63) Continuation of application No. PCT/JP2005/011202, filed on Jun. 14, 2005.

(30) Foreign Application Priority Data

Jun. 22, 2004 (JP) ............... 2004-184151

(51) Int. Cl.
*H01L 21/302* (2006.01)
(52) U.S. Cl. ............... 216/66; 216/79; 216/94
(58) Field of Classification Search ............ 216/66
See application file for complete search history.

(56) References Cited

U.S. PATENT DOCUMENTS 5,626,935 A * 5/1997 Goto et al. ............ 428/64.1

FOREIGN PATENT DOCUMENTS

| JP | 08-120470 | * | 5/1996 |
| JP | 2003-505891 | | 2/2003 |
| WO | 02/05315 A2 | | 1/2002 |
| WO | WO/2002/05315 | * | 1/2002 |

OTHER PUBLICATIONS

Allen (Gas-cluster ion-beam smoothing of chemo-mechanical-polish processed GaSb substrates; Journal of Electronic Materials; Aug. 2003).*
Human translation of paragraph 21 of the previously applied Naosuke reference; translated by Irina Knizhnik, USPTO translator on Jan. 15, 2009.*
U.S. Appl. No. 11/779,441, filed Jul. 18, 2007, Otsuka, et al.

* cited by examiner

*Primary Examiner*—Keith D Hendricks
*Assistant Examiner*—Patricia A George
(74) *Attorney, Agent, or Firm*—Oblon, Spivak, McClelland, Maier & Neustadt, P.C.

(57) ABSTRACT

A process for polishing a glass substrate required to have high-degree of flatness and smoothness, is provided. A preliminarily polished glass substrate is applied with a surface treatment by a first-step gas-cluster ion beam etching to improve the flatness, and then, the glass substrate is applied with a surface treatment by a second-step gas-cluster ion beam etching having different irradiation conditions of those of the first-step gas-cluster ion beam etching to improve the surface roughness, whereby the glass substrate is finish-polished to have a flatness of at most 0.05 μm and a surface roughness (Rms) of at most 0.25 nm.

5 Claims, 1 Drawing Sheet

PROCESS FOR POLISHING GLASS SUBSTRATE

CROSS-REFERENCE TO RELATED

This application is a continuation application of International Application No. PCT/JP2005/011202, filed Jun. 14, 2005 and claims benefit of priority under 35 U.S.C. § 119 from Japanese Application No. 2004-184151, filed Jun. 22, 2004.

TECHNICAL FIELD

The present invention relates to a process for polishing a glass substrate, in particular, to a process for polishing a glass substrate required to have a high degree of flatness and smoothness such as a glass substrate to be used for a reflection type photo mask for EUV (Extreme Ultra Violet) lithography in a semiconductor manufacturing process.

BACKGROUND ART

Heretofore, an exposure apparatus has been widely used for transferring a fine circuit pattern onto a wafer to produce an integrated circuit in the lithography technique. According to the progress in achieving high integration, high response speed and high performance of integrated circuits, miniaturization of the integrated circuits has progressed and the exposure apparatuses are requested to form an image of a circuit pattern on a wafer surface with a long focal depth and with high resolution, and use of an exposure light source emitting shorter wavelength has been in progress. As the exposure light source, besides the conventional g-line (wavelength 436 nm), i-line (wavelength 365 nm) and KrF excimer laser (wavelength 248 nm), ArF excimer laser (wavelength 193 nm) is starting to be employed. Further, in order to deal with next-generation integrated circuits having a circuit line width of at most 100 nm, F2 laser (wavelength 157 nm) is regarded as a predominant candidate for the exposure light source, but this light source is considered to cover only until the generation of 70 nm line width.

In such a technical trend, as a next generation exposure light source, a lithography technique using EUV light (extreme ultra violet light) attracts attention since it is considered to be applicable for plural generations of 45 nm and after. EUV light means light in a wavelength band in a soft X-ray region or in a vacuum ultra violet region, and specifically, light having a wavelength of from 0.2 to 100 nm. Currently, as a lithography light source, use of 13.5 nm has been studied. The principle of the exposure in this EUV lithography (hereinafter referred to as "EUVL") is the same as the conventional lithography in that a mask pattern is transferred by employing a projection optical system. However, since there are few materials transmitting light in the energy region of EUV light, it is not possible to use a refraction optical system, and a reflection optical system has to be employed instead. (Refer to JP-A-2003-505891)

A mask to be used for EUVL is basically constituted by (1) a glass substrate, (2) a reflective multi-layer film formed on the glass substrate, and (3) an absorptive material layer formed on the reflective multi-layer film. As the reflective multi-layer film, one having a structure that a plurality of materials having different refractive indexes at the wavelength of the exposure light, periodically laminated with the period in the order of nm, is employed, and Mo and Si are known as the typical materials. Further, as the absorptive layer, Ta and Cr are studied. As the glass substrate, a material having a low thermal-expansion coefficient is required so as not to have deformation even under irradiation of EUV light, and a glass having a low thermal-expansion coefficient or a crystallized glass have been studied. The glass substrate is produced by polishing such a glass or crystallized glass material with high precision and cleaning.

Further, as a method for polishing a surface of a work such as a glass or a metal to have a small surface roughness (smoothness), JP-A-8-120470 (with reference to paragraphs [0007] to [0011]) describes a method of precisely polishing a mechanically polished surface of a work having a predetermined surface roughness, by a gas-cluster ion beam. In this method, by irradiating the surface of the work with accelerated gas-cluster ions, the gas-cluster ions irradiated are destroyed by collision with the surface, and at this time, the ions collide with molecules or atoms constituting the work, and those molecules or atoms flow in the lateral direction with respect to the surface of the work, whereby the surface of the work is cut in the lateral direction. In the JP-A-8-120470 mentioned above, a metal mold, a glass substrate, a ceramic substrate or the like is exemplified as the work and argon, nitrogen gas, oxygen gas, carbon dioxide gas or the like is exemplified as the source gas for the gas-cluster ions.

DISCLOSURE OF THE INVENTION

Problems to be Solved by the Invention

However, such a high-precision polishing process by gas-cluster ion beam etching has a characteristic that when the acceleration voltage is increased, the energy of the cluster ion beam increases and polishing efficiency can be increased but the polished surface becomes rough. Therefore, when the acceleration voltage is set to be high to a certain extent to obtain a desired polishing efficiency, it becomes difficult to obtain a surface roughness of at most a certain value.

JP-A-8-120470 noted above discloses an example of finish-polishing a mechanically polished surface of a metal or a glass having a certain surface roughness, namely, a preliminarily polished surface of a metal or a glass, by $CO_2$ gas-cluster ion beam. According to this example, the surface roughness (Ra) after the finish polishing by a $CO_2$ gas-cluster ion beam is at most about 0.28 nm (2.8 Å) depending on the degree of the preliminary polishing. Therefore, such a process is not sufficiently suitable for glass substrates required to have an extremely high surface accuracy, such as optical components of exposure apparatuses for manufacturing semiconductors in generations of 45 nm and after.

Further, conventional gas-cluster ion beam etching processes are mainly focused on improvement of surface roughness by a single-step process. Therefore, when a preliminarily polished glass substrate is finish-polished by this process, a large irregularity (waviness) generated by the preliminary polishing cannot be substantially removed, and little effect of improving the flatness can be obtained. A glass substrate finish-polished by conventional gas-cluster ion beam etching process has created the problem of flatness.

The present invention has been made to cope with the above problems, and it is an object of the present invention to provide a process of finish-polishing a glass substrate required to have high smoothness and flatness such as a glass substrate of a reflective mask for EUVL use, by a gas-cluster ion beam etching process.

Means for Solving the Problem

To solve the above problem, the inventors of the present invention have conducted extensive studies as to polishing of a glass substrate for optical component for an exposure apparatus for manufacturing a semiconductor having a line width of at most 45 nm, and as a result, they have found that the surface roughness can be improved without deteriorating the flatness by improving the flatness of a preliminarily polished glass substrate by applying a surface treatment of a gas-cluster ion beam etching, followed by applying a surface treatment of another gas-cluster ion beam etching under conditions different from those of the first gas-cluster ion beam etching. Namely, they have found that excellent flatness and surface roughness can be obtained by finish-polishing a preliminarily polished glass substrate by two-steps of gas-cluster ion beam etching, whereby the present invention has been achieved. Namely, the present invention provides a process for polishing a glass substrate as follows.

(1) A process for polishing a glass substrate, comprising steps of:

applying a surface treatment to a preliminarily polished glass substrate by a first-step gas cluster ion-beam etching to improve the flatness of the glass substrate, applying a surface treatment to the glass substrate by a second-step gas cluster ion-beam etching under irradiation conditions different from those of the first-step gas cluster ion-beam etching to improve the surface roughness of the glass substrate, whereby the glass substrate is finish-polished to have a flatness of at most 0.05 μm and a surface roughness (Rms) of at most 0.25 nm.

(2) The process for polishing a glass substrate according to (1), wherein the glass substrate is a quartz glass.

(3) The process for polishing a glass substrate according to (1) or (2), wherein the glass substrate is a low-expansion glass substrate having a thermal expansion coefficient of 0±30 ppb/° C. when the temperature of the glass substrate is 20° C.

(4) The process for polishing a glass substrate according to (1), (2) or (3), wherein the acceleration voltage of the cluster ion beam in the first-step gas cluster ion-beam etching is set to be higher than the acceleration voltage of the cluster ion beam in the second-step gas cluster ion-beam etching.

(5) The process for polishing a glass substrate according to any one of (1) to (4), wherein the glass substrate is preliminarily polished to have a surface roughness (Rms) of at most 0.005 μm and a flatness of at most 0.5 μm.

(6) The process for polishing a glass substrate according to any one of (1) to (5), wherein the source gas for the first-step gas cluster ion-beam etching is a mixed gas containing $SF_6$, Ar and $O_2$ or a mixed gas consisting of $NF_3$, Ar and $O_2$, and the source gas for the second-step gas cluster ion-beam etching is $O_2$.

(7) The process for polishing a glass substrate according to any one of (1) to (6), wherein the flatness of the glass substrate is improved to be at most 0.05 μm by the first-step gas cluster ion-beam etching, and then, the surface roughness (Rms) of the glass substrate is improved to be at most 0.25 nm by the second-step gas cluster ion-beam etching while the flatness is substantially maintained.

(8) The process for polishing a glass substrate according to any one of (1) to (7), wherein the second-step gas cluster ion-beam etching is carried out with a plurality of steps.

(9) The process for polishing a glass substrate according to (8), wherein the second-step gas cluster ion beam etching is carried out in a manner that the acceleration voltage of the cluster ion beam is lowered stepwise.

BEST MODE FOR CARRYING OUT THE INVENTION

Figure 1:
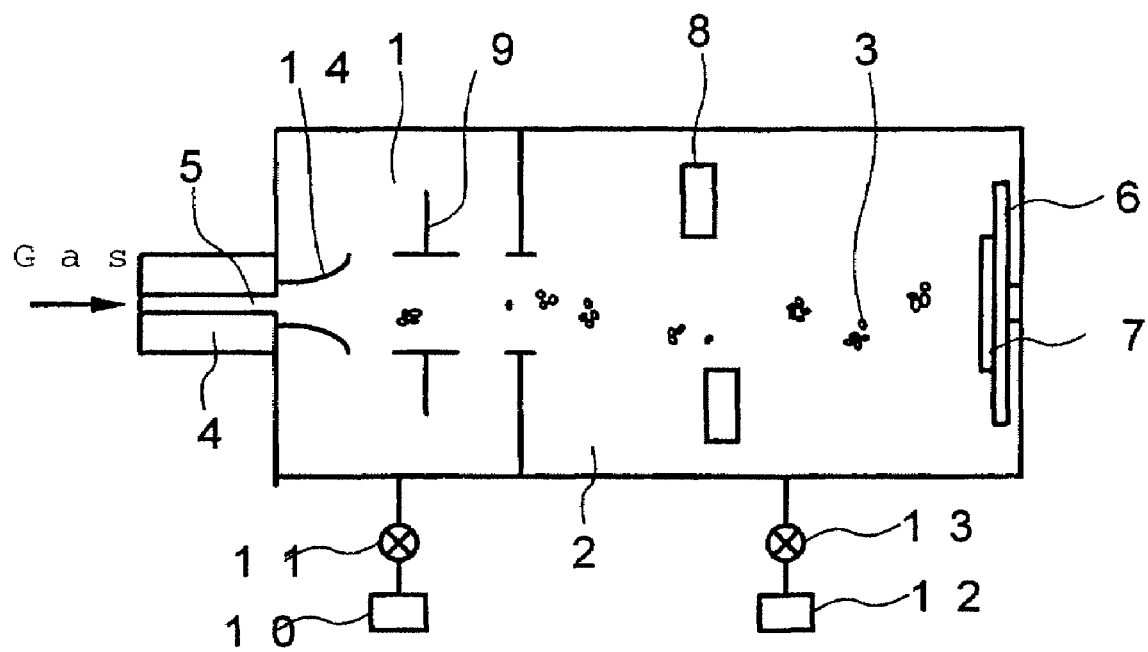
FIG. 1 is a schematic view showing an example of the gas-cluster ion beam etching apparatus employed in the present invention.

The glass substrate as an object to be finish-polished in the present invention, is preferably a glass having a small thermal-expansion coefficient with a narrow dispersion of the coefficient and usable as a substrate for a reflective mask for EUVL, which can deal with high integration and high-precision of integrated circuits. Specifically, a low-expansion glass having a thermal-expansion coefficient of 0±30 ppb/° C. at 20° C. is preferred, in particular, a super-low expansion glass having a thermal-expansion coefficient of 0±10 ppb/° C. at 20° C. is preferred.

As such a low-expansion glass and a super-low expansion glass, a quartz glass containing $SiO_2$ as the main component can be employed. Specifically, a low-expansion glass or a low-expansion crystallized glass such as a synthesized quartz glass containing $TiO_2$, ULE (Trade name: Corning code 7972) or ZERODUR (Trade name of Schott in Germany), may be mentioned. The shape, the size, the thickness and the like of the glass substrate is not limited and the shape is usually a rectangular shape.

In the present invention, a glass substrate to be finish-polished by a gas-cluster ion beam etching (hereinafter referred to as GCIB), is mechanically polished to have a predetermined flatness and surface roughness before the polishing by GCIB. Namely, the present invention is to finish-polish a preliminarily polished glass substrate by GCIB. The finish-polishing time by GCIB and the surface properties of a glass substrate after finish-polishing are influenced by the preliminary polishing. Namely, the more sufficiently the preliminary polishing of the glass substrate is applied, the more the work load of finish-polishing by GCIB is reduced and the more polishing time can be reduced. Further, when the glass substrate is preliminarily polished to have a predetermined flatness or a surface roughness, the accuracy of finish-polishing by GCIB can be improved.

In a preferred embodiment of the present invention, the flatness of the preliminarily polished surface of a glass substrate is preferably at most 0.5 μm, more preferably at most 0.25 μm. If the flatness is larger than 0.5 μm, waviness generated by the preliminary polishing is usually remaining, work load of GCIB is increased for removing the waviness and it may become impossible to finish polish the glass substrate to have a flatness of at most 0.05 μm. In the present invention, the flatness means a flatness per a unit area of 142 mm of a glass substrate, and this definition is applicable to the descriptions mentioned below. Here, the flatness of a glass substrate can be measured by using a FM300 laser interferometric flatness tester (manufactured by Corning Tropel). However, the measurement method is not limited to the flatness tester, the flatness can also be measured by measuring the vertical profile of the glass substrate by using a laser displacement meter, an ultrasonic displacement meter or a contact type displacement meter.

Further, the surface roughness (Rms) of the preliminarily polished glass substrate is preferably at most 0.005 μm, more preferably at most 0.001 μm. Here, the surface roughness (Rms) means a surface roughness measured by an atomic force microscope (hereinafter the same definition is applied). If the surface roughness (Rms) is larger than 0.005 μm, it may take a long time to finish-polish by GCIB, or a surface having a surface roughness (Rms) of at most 0.25 nm may not be obtained even by applying GCIB for a predetermined time. The preliminary polishing can be carried out by a conventional polishing process. For example, it can be carried out by a double-sided lapping machine or a double-sided polishing machine, and a commercially available polishing tool and a polishing material can be appropriately employed.

In the present invention, such a preliminarily polished glass substrate is processed with GCIB to finish-polish the glass substrate to have a surface roughness (Rms) of at most 0.25 nm, particularly preferably at most 0.15 nm. From now, the GCIB is described with reference to drawings. However, the present invention is not limited to the drawings and the description. FIG. 1 is a schematic view schematically showing the construction of a gas-cluster ion beam etching apparatus (hereinafter referred to as GCIB apparatus) to be used for finish polishing a glass substrate. As shown in FIG. 1, a GCIB apparatus is constituted by a cluster generating chamber 4 for making a source gas supplied from a gas bottle (not shown) adiabatically expand, an ionizing chamber 1 evacuated by an evacuation pump 10, and an etching chamber 2 evacuated by an evacuation pump 12. A gas cluster is formed by jetting out from a nozzle 5 a gas injected in the cluster generating chamber 4, into a vacuum environment in the ionizing chamber 1 at a pressure at few atms, and the gas cluster is shaped by a schemer 14, and is then ionized by an ionizing electrode 9 disposed in the ionizing chamber to be cluster ion 3. Thus, the ionized cluster ions 3 are controlled to have a beam shape of a parallel beams, and is accelerated by an acceleration electrode 8 in the etching chamber 2, and a glass substrate 7 attached to an adapter plate 6 provided in the opposing portion of the etching chamber 2 is irradiated with the cluster ions 3. Reference numerals 11 and 13 in the figure indicate open/close valves for the evacuation pumps 10 and 12 respectively.

The cluster ions 3 ionized in the ionizing chamber 1, does not have a construction that every atom constituting the gas cluster has an electric charge, but has a construction such that, as shown in the Figure, one of the atoms constituting the gas cluster has an electric charge, and other atoms of the gas cluster are weakly bonded around the atom to form an atomic group (agglomerate). When such an atomic group collides with the glass substrate 7, a multiple-body collision effect generated in an interaction with a solid body polishes the surface of the glass substrate.

In the present invention, such a GCIB apparatus is used so that a glass substrate preliminarily polished in advance is subjected to a first-step GCIB to improve the flatness and then, by treating the surface of the glass substrate whose flatness is thus improved, subjected to the second-step GCIB to improve the surface roughness. Namely, in the present invention, the surface of the glass substrate is treated with such a two-step GCIB: the waviness of the surface of the glass substrate generated in the process of preliminary polishing is removed by the first-step GCIB to form a flat surface having substantially no waviness, and then, such surface is treated with the second-step GCIB to reduce fine irregularities in order to obtain a substrate which is excellent in terms of flatness and smoothness. In this case, even if the surface roughness becomes rough in the process of the first-step GCIB, the surface roughness can be improved by the second-step GCIB so as to have a predetermined surface roughness. The second-step GCIB is preferably carried out under conditions which are milder than the conditions of the first-step GCIB. More specifically, the etching process is carried out after setting the acceleration voltage of the cluster ion beam in the second-step GCIB lower than the acceleration voltage of the cluster ion beam in the first-step GCIB. For example, the acceleration voltage of the cluster ion beam in the second-step GCIB is preferably at most a half of the acceleration voltage of the first-step. Those first-step GCIB and the second-step GCIB may be carried out with the same GCIB apparatus but with different irradiation conditions such as the source gas or acceleration voltage, or else, a glass substrate treated in a GCIB apparatus for the first-step may be transferred to another GCIB apparatus for the second-step having different irradiation conditions so as to be subjected to the second-step GCIB treatment.

Further, in a preferred embodiment of the present invention, the acceleration voltage of the second-step GCIB is initially set to be high, and then is gradually decreased continuously or stepwise, whereby the efficiency of the second-step GCIB treatment can be improved. Namely, at a time of improving the surface roughness by the second-step GCIB, if the treatment is carried out under a low acceleration voltage for reducing the roughness of the substrate, it takes a long time to improve the roughness. However, by making the acceleration voltage high to increase the polishing efficiency to reduce the treatment time in the initial stage of the second-step GCIB treatment, and then, by reducing the acceleration voltage to improve the polishing accuracy, the surface of the glass substrate can be finish polished so as to have a predetermined surface roughness. Usually, from the aspect of polishing efficiency, it is preferred to reduce the acceleration voltage in 2 to 4 steps. For example, the acceleration voltage of cluster ion beam 1 in the first-step GCIB for improving flatness, is set to 30 kV, and the acceleration voltage of cluster ion beam in the second-step GCIB for final smoothing of surface roughness, is set to 5 kV, whereby the process is carried out in such a manner that a treatment for improving the flatness in the first-step GCIB is carried out at 30 kV and in the second-step treatment, rough removal of the surface roughness is carried out at first at 10 kV, then improving the surface roughness at 7.5 kV, and further, the final smoothing of surface roughness is carried out at 5 kV. By this process, the time necessary for the process to be completed can be reduced as compared with a case of removing the surface roughness at 5 kV from the beginning of the process.

As the source gas for the first-step GCIB, a gas such as $SF_6$, Ar, $O_2$, $NF_3$, $N_2O$, $CHF_4$, $C_2F_6$, $C_3F_8$, $SiF_4$ or $COF_2$ may be used alone or used as a mixture. Among these, $SF_6$ and $NF_3$ are excellent as source gases for the first-step GCIB in terms of chemical reaction occurred when the gas is collided with the surface, and in particular, a gas as a mixture of $SF_6$, Ar and $O_2$ or a mixture of $NF_3$, Ar and $O_2$ is preferred. In a case of a gas as a mixture of $SF_6$, Ar and $O_2$, the mixture ratio of these $SF_6$, Ar and $O_2$ depends on e.g. irradiation conditions, and it is preferably within a range such that $SF_6$:Ar:$O_2$=0.1 to 2%: 9.9 to 99.9%: 50 to 99.9% by volume %. Further, as the source gas for the second-step GCIB, a gas such as $O_2$, Ar, CO or $CO_2$ may be used alone or used as a mixture. Among these, $O_2$ or Ar is preferably used.

In the present invention, the acceleration voltage of the cluster ion beam applied to the acceleration electrode 8, and the electric current applied to the ionizing electrode 9 and the like can be different between the first-step GCIB and the second-step GCIB. In the preferred embodiment of the present invention, as described above, the acceleration voltage of the first-step GCIB for improving the flatness of the glass substrate, is set to be high so that the glass substrate is irradiated with cluster ions with large energy. On the other hand, the acceleration voltage in the second-step GCIB is set to be lower than that in the first-step GCIB to carry out a fine surface-finish polishing by lowering the energy of the cluster ion beam. Specifically, the acceleration voltage of the first-step GCIB is preferably from 15 to 30 kV, and the acceleration voltage of the second-step GCIB is preferably from 3 to less than 30 kV, more preferably from 3 to 20 kV. The ionizing current is also usually set to be larger in the first-step GCIB than in the second-step GCIB. Here, the irradiation conditions such as the acceleration voltage and the ionizing current in the first-step GCIB and the second-step GCIB, can be appropriately determined considering the type of source gas or the surface property of preliminarily polished glass substrate.

Figure 2:
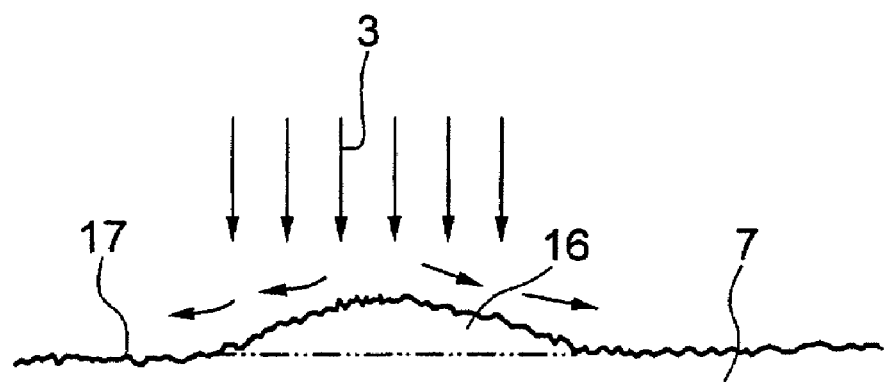
FIG. 2 is a schematic view illustrating an embodiment of removing a waviness of a glass substrate by the first-step gas-cluster ion beam etching of the present invention.

FIG. 2 is a schematic view illustrating a case of removing an area of waviness 16 of a glass substrate 7 by the first-step GCIB. As shown in FIG. 2, the surface of the preliminarily polished glass substrate 7 has a portion of fine irregularity 17 causing surface roughness and a waviness 16 causing deterioration of flatness. When the waviness 16 of the glass substrate 7 is irradiated with accelerated cluster ions 3, the cluster ions 3 of the ion beam are collided with the surface of the area of waviness 16 with a large amount of energy, and move horizontally along the glass substrate to thereby produce an etching effect to polish the surface of the glass substrate. In this case, by irradiating the glass substrate 7 with cluster ions 3 concentrated on the area of waviness 16, the convex portion of the area of waviness 16 can be removed efficiently. By removing entirely or partially the convex portion of the waviness 16 by the first-step GCIB, the flatness of the glass substrate 7 can be improved to approximately at most 0.05 µm. Namely, a flatness of, for example, about from 0.25 to 0.5 µm before the GCIB treatment can be improved so as to be at most about 0.05 µm by reducing the convex portion of the area of waviness 16 by the first-step GCIB. Further, even if the portion of fine irregularities 17 is increased and the surface roughness of the glass substrate 7 is deteriorated by the irradiation of the cluster ions in the first-step GCIB, the fine irregularity portion 17 is smoothened by the second-step GCIB as described above, whereby the surface roughness (Rms) of the entire surface of the glass substrate 7 can be improved to be at most 0.25 nm.

EXAMPLE

An ingot of synthesized quartz glass containing 7 mass % of $TiO_2$ produced by a flame hydrolysis method, was cut into a plate shape of 153.0 mm high×153.0 mm wide×6.75 mm thick by an inner blade slicer, to prepare 60 plate-shaped samples of synthesized quartz glass. Then, these samples were applied with a chamfer process by a commercially available NC chamfering machine with a diamond grinding stone of #120 so that the external dimension became 152 mm and the chamfering width became from 0.2 to 0.4 mm.

Then, each of the plate-shaped synthesized quartz glass samples was polished by employing a 20B double-sided lapping machine manufactured by Speedfam Co., Ltd. and employing as a polishing material, a slurry of from 18 to 20 mass % of GC#400 (trade name, manufactured by Fujimi Incorporated) consisting essentially of SiC, suspended in a filtered water, so that the thickness became 6.63 mm.

Further, by employing another 20B double-sided lapping machine, and as a polishing material, a slurry of from 18 to 20 mass % of suspended FO#1000 (trade name, manufactured by Fujimi Incorporated) consisting essentially of $Al_2O_3$, each plate was polished until the thickness became 6.51 mm. Then, using a slurry containing cerium oxide as the main constituent and a buff, the outer periphery of the plate was polished to remove 30 µm as a mirror finish process of end faces.

Then, both surfaces of each of these plates were polished to remove 50 µm in total for both surfaces as a first-polishing by employing a 20B double-sided polishing machine manufactured by Speedfam Co. with, as an abrasive cloth, LP66 (trade name, manufactured by Rhodes Co.) and as a polishing abrasive, Mirek 801A (trade name, manufactured by Mitsui Kinzoku Co.) containing cerium oxide as a main component.

Further, by employing the 20B double-sided polishing machine, and employing as an abrasive cloth, Seagull 7355 (trade name, manufactured by Toray Coatex Co., Ltd.) made of urethane foam and as a polishing abrasive, the above mentioned Mirek 801A, both surfaces of each of the above plates were polished to remove 10 µm in total for both surfaces, applied with a simple cleaning and a precise cleaning to obtain quartz glass substrates (hereinafter referred to as substrates) each preliminarily polished to have a surface roughness (Ra) of 0.2 nm and a flatness of 0.25 µm. In order to further improve the flatness and the surface roughness of the substrates, the following two-step GCIB, namely a first-step GCIB for flatness-improvement to improve the flatness of thus preliminarily polished substrates and a second-step GCIB for improving the surface roughness of the substrates subjected to a surface treatment by the first-step GCIB, were carried out.

In the first-step GCIB, employing a gas-cluster ion beam etching apparatus, cluster ions of the GCIB were generated from a mixed gas of $SF_6$: 1%, $O_2$: 24% and Ar: 75% by volume %, and an area of 142 mm of the substrate was irradiated with the cluster ions of the GCIB thus generated under conditions of an acceleration voltage of 30 kV, a cluster size of at least 1,000 pieces, an ion current of 300 µA and a dose amount of $1\times10^{16}$ ions/cm$^2$ for 1 hour. By the irradiation with the cluster ions if the GCIB, the flatness of the substrate was improved to be 0.05 µm. However, the surface roughness was deteriorated to 1 nm (Rms) by the strong irradiation of cluster ions in the first-step GCIB.

In the second-step GCIB, in order to improve thus deteriorated surface roughness, the source gas of the gas-cluster ion beam etching apparatus was changed to form $O_2$ cluster ions, and an area of 142 mm of the substrate is irradiated with the $O_2$ cluster ions under conditions of an acceleration voltage of 10 kV, a cluster size of at least 1,000 pieces and a dose amount of $5\times10^{15}$ ions/cm$^2$ for 1 hour. Further, the area of 142 mm of the substrate was irradiated with the cluster ions under conditions of an acceleration voltage of 5 kV, a cluster size of at least 1,000 pieces and a dose amount of $2\times10^{15}$ ions/cm$^2$ for 1 hour. By setting the acceleration voltage of the second-step GCIB to be smaller than that of the first-step GCIB, and by setting the acceleration voltage of first half of the second-step GCIB to be smaller than that of the second half of the second-step GCIB, the substrate having a flatness improved by the first-step GCIB, was applied with an effective smooth-finish polishing without deteriorating the flatness to have an improved surface roughness (Rms) of 0.14 nm.

Here, the flatness of the substrate was measured by FM300 laser interferometric type flatness tester (manufactured by Corning Tropel). Further, the surface roughness was measured by an atomic force microscope (AFM) SPI3800N (manufactured by Seiko Instruments Inc.).

EFFECTS OF THE INVENTION

According to the present invention, by finish-polishing a preliminarily polished glass substrate by two-step gas-cluster ion beam etching, both of the flatness and the surface roughness of the glass substrate can be improved, whereby it is possible to polish the glass substrate to have a flatness of at most 0.05 μm and a surface roughness (Rms) of at most 0.25 nm. According to this process, it is possible to obtain a glass substrate having excellent smoothness and flatness usable for e.g. a substrate for optical components of an exposure apparatus for producing a semiconductor of next generation having a line width of at most 45 nm.

INDUSTRIAL APPLICABILITY

According to the present invention, it is possible to polish a glass substrate to have a surface of high quality excellent in flatness and smoothness, and thus the present invention is suitable for polishing a high-quality glass substrate to be employed for e.g. components for optical system of an exposure apparatus for producing semiconductors having a line width of at most 45 nm.

The entire disclosure of Japanese Patent Application No. 2004-184151 filed on Jun. 22, 2004 including specification, claims, drawings and summary is incorporated herein by reference in its entirety.

What is claimed is:

1. A polishing process, comprising:
applying a surface treatment to a preliminarily polished $TiO_2$-containing quartz glass substrate having a flatness of at most 0.5 μm and a surface roughness of at most 0.001 μm by a first gas cluster ion-beam etching to improve the flatness of the glass substrate to be at most 0.05 μm, and subsequently applying a surface treatment to the glass substrate by a second gas cluster ion-beam etching under irradiation conditions different from those of the first gas cluster ion-beam etching to improve the surface roughness of the glass substrate, such that the glass substrate is finish-polished to have a flatness of at most 0.05 μm and a surface roughness (Rms) of at most 0.25 nm,
wherein a source gas for the first gas cluster ion-beam etching is selected from a group consisting of $SF_6$; Ar; $O_2$; $NF_3$; a mixed gas containing $SF_6$, Ar and $O_2$; and a mixed gas containing $NF_3$, Ar and $O_2$, and wherein a source gas for the second gas cluster ion-beam etching is selected from a group consisting of $O_2$; $CO_2$; and a mixed gas of $O_2$ and $CO_2$, and
wherein the acceleration voltage of the cluster ions in the first gas cluster ion-beam etching is set to be higher than an acceleration voltage of the cluster ions in the second gas cluster ion-beam etching.

2. The process according to claim 1, wherein the glass substrate is a low-expansion glass substrate having a thermal expansion coefficient of 0±30 ppb/° C. when the temperature of the glass substrate is 20° C.

3. The process according to claims 1 or 2, wherein the second gas cluster ion-beam etching is carried out in a plurality of steps.

4. The process according to claim 1, wherein the second gas cluster ion-beam etching is carried out in a manner such that the acceleration voltage of the cluster ion is lowered stepwise.

5. The process according to claim 1, wherein the glass substrate is finish-polished to have a surface roughness (Rms) of at most 0.15 nm.

* * * * *